United States Patent
Nakagawa et al.

(10) Patent No.: US 12,128,880 B2
(45) Date of Patent: Oct. 29, 2024

(54) PARKING ASSISTANCE DEVICE

(71) Applicant: TOYOTA JIDOSHA KABUSHIKI KAISHA, Toyota (JP)

(72) Inventors: Takuya Nakagawa, Nagoya (JP); Asuka Shimizu, Nagoya (JP); Norio Imai, Anjyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 71 days.

(21) Appl. No.: 17/950,436

(22) Filed: Sep. 22, 2022

(65) Prior Publication Data

US 2023/0101882 A1 Mar. 30, 2023

(30) Foreign Application Priority Data

Sep. 28, 2021 (JP) .................................. 2021-157781

(51) Int. Cl.
*B60Q 1/48* (2006.01)
*B60W 10/18* (2012.01)
*B60W 10/20* (2006.01)
*B60W 30/06* (2006.01)
*B60W 50/08* (2020.01)
(Continued)

(52) U.S. Cl.
CPC ............ *B60W 30/06* (2013.01); *B60W 10/18* (2013.01); *B60W 10/20* (2013.01); *B60W 50/085* (2013.01); *B60W 2050/0063* (2013.01); *B60W 2552/50* (2020.02); *B60W 2554/802* (2020.02); *B60W 2710/207* (2013.01)

(58) Field of Classification Search
CPC ...... B60W 30/06; B60W 10/18; B60W 10/20; B60W 50/085; B60W 2554/802; B60W 2552/50; B60W 2050/0063; B60W 2710/207
See application file for complete search history.

(56) References Cited

U.S. PATENT DOCUMENTS 4,931,930 A * 6/1990 Shyu .................... B62D 15/028
180/199
9,522,675 B1 * 12/2016 You ....................... B60W 30/06
(Continued)

FOREIGN PATENT DOCUMENTS

JP 2017-213943 A 12/2017
JP 2019-127189 A 8/2019

*Primary Examiner* — Quang Pham
(74) *Attorney, Agent, or Firm* — Sughrue Mion, PLLC (57) ABSTRACT

A parking assistance control device detects a parkable area, where a host vehicle can be parked, based on target information, causes the vehicle to move from the initial position, which is the vehicle's position when the parkable area is detected, to the parkable area by controlling a driving device, braking device, and steering device and, when the target information indicates that a stopper is installed in the parkable area, causes the vehicle to stop with its position and direction with respect to the stopper matching a predetermined position and direction. The parking assistance control device causes the vehicle to stop with the distance between the vehicle's predetermined first reference point and the stopper matching a first predetermined value so that the vehicle is forward-parked in the state where the front end of a part, provided on the vehicle's front side and lower than the stopper, is separated from the stopper.

4 Claims, 7 Drawing Sheets

(51) Int. Cl.
*G08G 1/14* (2006.01)
*B60W 50/00* (2006.01)

(56) References Cited

U.S. PATENT DOCUMENTS

| | | | | |
|---|---|---|---|---|
| 9,862,416 | B2* | 1/2018 | Imai | B60K 31/0008 |
| 10,246,131 | B2* | 4/2019 | Terkes | B62D 15/0285 |
| 10,685,567 | B2* | 6/2020 | Blinkle | B62D 15/027 |
| 10,800,404 | B2* | 10/2020 | Kato | G05D 1/0212 |
| 11,351,914 | B2* | 6/2022 | Shoda | G08G 1/146 |
| 11,377,099 | B2* | 7/2022 | Shoda | G06V 20/586 |
| 11,458,959 | B2* | 10/2022 | Hara | B60W 30/0956 |
| 11,845,382 | B2* | 12/2023 | Choi | B60W 30/143 |
| 2004/0119610 | A1* | 6/2004 | Maemura | B60Q 9/005 |
| | | | | 348/148 |
| 2006/0287826 | A1* | 12/2006 | Shimizu | B60R 1/28 |
| | | | | 701/431 |
| 2007/0010918 | A1* | 1/2007 | Shimazaki | B62D 15/0275 |
| | | | | 701/1 |
| 2011/0087406 | A1* | 4/2011 | Barth | B60Q 1/48 |
| | | | | 701/41 |
| 2013/0073119 | A1* | 3/2013 | Huger | B62D 15/027 |
| | | | | 701/1 |
| 2013/0166190 | A1* | 6/2013 | Ikeda | B60R 1/27 |
| | | | | 701/400 |
| 2014/0104422 | A1* | 4/2014 | Choi | G06V 10/507 |
| | | | | 348/148 |
| 2014/0324310 | A1* | 10/2014 | Kobayashi | B62D 15/027 |
| | | | | 701/70 |
| 2014/0368636 | A1* | 12/2014 | Lee | B62D 15/0285 |
| | | | | 348/118 |
| 2016/0311429 | A1* | 10/2016 | Holland-Letz | B60W 10/18 |
| 2017/0203757 | A1* | 7/2017 | Ohbayashi | B60W 30/085 |
| 2017/0259850 | A1* | 9/2017 | Yamashita | B62D 6/00 |
| 2017/0305467 | A1* | 10/2017 | Nordbruch | G08G 1/146 |
| 2018/0208244 | A1* | 7/2018 | Nakayama | B62D 15/0285 |
| 2018/0257665 | A1* | 9/2018 | Sannodo | B60W 30/06 |
| 2018/0339701 | A1* | 11/2018 | Kwon | G05D 1/0257 |
| 2019/0004508 | A1* | 1/2019 | Bonander | B60W 30/06 |
| 2019/0066514 | A1* | 2/2019 | Yamamura | B60W 30/06 |
| 2019/0276010 | A1* | 9/2019 | Mason | G05D 1/0212 |
| 2019/0291722 | A1 | 9/2019 | Maeda et al. | |
| 2019/0303691 | A1* | 10/2019 | Maeda | G06F 18/253 |
| 2020/0079359 | A1* | 3/2020 | Tsujino | B60W 30/06 |
| 2020/0265605 | A1* | 8/2020 | Kaneko | B60R 11/04 |
| 2020/0298839 | A1* | 9/2020 | Inoue | B60W 10/20 |
| 2020/0339196 | A1* | 10/2020 | Jang | B60W 60/0025 |
| 2020/0361451 | A1* | 11/2020 | Noguchi | G08G 1/146 |
| 2020/0398827 | A1* | 12/2020 | Hara | B60W 30/06 |
| 2020/0410860 | A1* | 12/2020 | Jeong | B60W 50/14 |
| 2021/0101586 | A1* | 4/2021 | Woo | B62D 15/0285 |
| 2021/0118299 | A1* | 4/2021 | Yata | B62D 6/00 |
| 2021/0146915 | A1 | 5/2021 | Niewiadomski et al. | |
| 2021/0179076 | A1* | 6/2021 | Nakada | G06V 20/58 |
| 2021/0179083 | A1* | 6/2021 | Hara | B62D 15/0285 |
| 2021/0284239 | A1* | 9/2021 | Sakakibara | B62D 15/0275 |
| 2021/0300335 | A1* | 9/2021 | Hara | B60W 30/06 |
| 2021/0300336 | A1* | 9/2021 | Hara | G06V 20/58 |
| 2021/0300341 | A1* | 9/2021 | Shoda | B60W 30/06 |
| 2021/0323538 | A1* | 10/2021 | Takahashi | G06V 20/586 |
| 2022/0161850 | A1* | 5/2022 | Yu | B60R 11/04 |
| 2023/0101882 | A1* | 3/2023 | Nakagawa | B60W 10/18 |
| | | | | 340/932.2 |
| 2023/0175301 | A1* | 6/2023 | Song | B60W 50/14 |
| | | | | 701/49 |
| 2023/0242103 | A1* | 8/2023 | Miyazaki | B60W 30/09 |
| | | | | 701/301 |

\* cited by examiner

| MOVEMENT PATH | P0 | P1 | P2 | ... | P5 | P6 | P7 | ... | PP |
|---|---|---|---|---|---|---|---|---|---|
| SHIFT PATTERN | SP→SD | | | | SD→SR | | | | SR→SP |
| SPEED PATTERN | FORWARD / REVERSE | | | | | | | | |
| RUDDER ANGLE PATTERN | RIGHT / LEFT | | | | | | | | |

PARKING ASSISTANCE DEVICE

CROSS-REFERENCE TO RELATED APPLICATION

This application claims priority to Japanese Patent Application No. 2021-157781 filed on Sep. 28, 2021, incorporated herein by reference in its entirety.

BACKGROUND

1. Technical Field

The present disclosure relates to a parking assistance device that performs parking assistance control for parking a vehicle in a predetermined position.

2. Description of Related Art

Conventionally, a parking assistance device has been proposed that detects targets around a vehicle using surroundings sensors such as "cameras, sensors, etc." mounted on the vehicle, determines an area where the vehicle is to be parked based on the detected targets, and performs parking assistance control to allow the vehicle to autonomously travel to the area for parking there (see, for example, Japanese Unexamined Patent Application Publication No. 2019-127189 (JP 2019-127189 A)).

The device proposed in JP 2019-127189 A (hereinafter referred to as "conventional device") detects a stopper as a target around the vehicle based on the information acquired from the surroundings sensor. In most cases, an area where a vehicle is parked has a rectangular shape in a plan view and, in that area, the stopper is installed near the short side and in parallel to the extending direction of the short side. The conventional device performs parking assistance control in such a way that, with the front-rear direction of the vehicle and the extending direction of the stopper almost orthogonal to each other (the width direction of the vehicle and the extending direction of the stopper are parallel), the wheels of the vehicle come into contact with the stopper.

SUMMARY

The problem here is that, in some cases, the distance between the lower surface of the front side of the vehicle and the ground is relatively small. In particular, some of the exterior parts on the front side of the vehicle are sometimes lower in height than the stopper. In this case, these parts may hit the stopper, sometimes with the result that these parts are damaged during forward parking. For example, the current plate extending downward from the lower surface of the bumper cover on the front side of the vehicle is provided in some cases. This current plate may hit the stopper, sometimes with the result that the current plate is damaged during forward parking.

One of the objects of the present disclosure is to provide a parking assistance device that can prevent the body (exterior part) of a vehicle from hitting a stopper.

To achieve the object described above, a first aspect of the present disclosure relates to a parking assistance device including a driving device, a braking device, a steering device, a surroundings sensor, and a parking assistance control device. The driving device is configured to apply driving force to the driving wheels of the wheels of a host vehicle. The braking device is configured to apply braking force to the wheels. The steering device is configured to control the steering angle of the steered wheels of the wheels. The surroundings sensor is configured to acquire target information. The target information is information about targets around the host vehicle. The parking assistance control device is mounted on the host vehicle and is configured to perform parking assistance control. The parking assistance control is configured to detect a parkable area based on the target information, to cause the host vehicle to move from the initial position into the parkable area by controlling the driving device, the braking device, and the steering device. The parkable area is an area where the host vehicle can be parked. The initial position is the position of the host vehicle at the time when the parkable area is detected. When it is detected based on the target information that a stopper is installed in the parkable area, the parking assistance control is configured to cause the host vehicle to stop with the position and direction of the host vehicle with respect to the stopper matching a predetermined position and direction. The parking assistance control device is configured to cause the host vehicle to stop with the distance between the predetermined first reference point of the host vehicle and the stopper matching a first predetermined value so that the host vehicle is forward parked in the state in which the front end of a part that is on the front side of the host vehicle and is lower than the stopper is separated from the stopper.

The parking assistance device of the present disclosure causes the vehicle to be forward parked in the state in which a part that is on the front side of the vehicle and is lower than the stopper is separated from the stopper. Therefore, the present disclosure makes it possible to prevent the front side of the vehicle from hitting the stopper and from being damaged.

In the parking assistance device according to the first aspect, a driver may be able to change the first predetermined value.

This allows the distance between the stopper and the host vehicle (first reference point) to be changed according to the driver's preference when the vehicle is forward parked.

In the parking assistance device according to a second aspect, the parking assistance device may be configured to cause the host vehicle to stop with the distance between the predetermined second reference point of the host vehicle and the stopper matching a second predetermined value so that the host vehicle is reverse parked in the state in which the rear end of a part that is on the rear side of the host vehicle and is lower than the stopper is separated from the stopper.

The parking support device according to the second aspect causes the vehicle to be reverse parked in the state in which a part that is on the rear side of the vehicle and is lower than the stopper is separated from the stopper. Therefore, the present disclosure makes it possible to prevent the rear side of the vehicle from hitting the stopper and from being damaged.

In the parking assistance device according to the second aspect, a driver may be able to change the second predetermined value.

This allows the distance between the stopper and the host vehicle (second reference point) to be changed according to the driver's preference when the vehicle is reverse parked.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Configuration

Figure 7A:
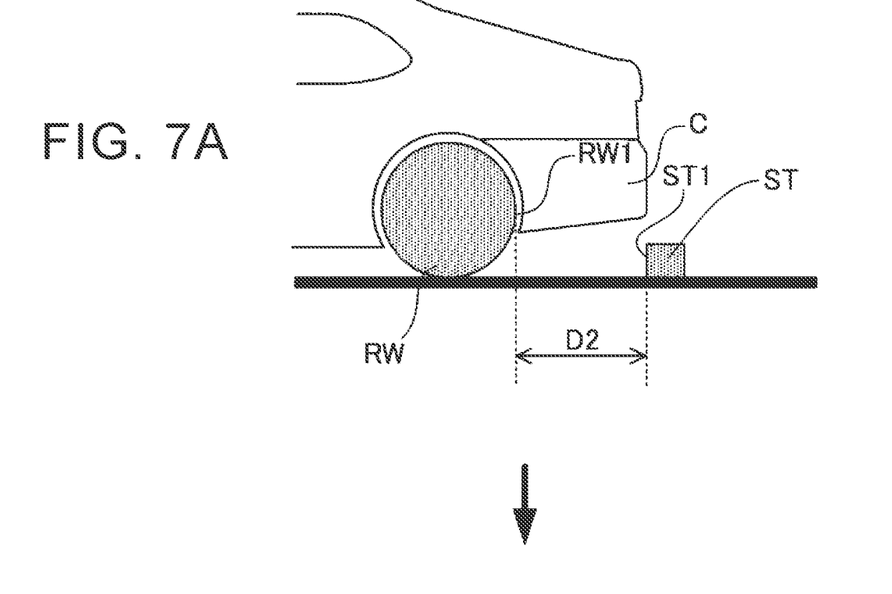
FIG. 7A is a side view showing a positional relationship between a vehicle parked in the reverse parking mode and a stopper.

A parking assistance device 1 according to one embodiment of the present disclosure is applied to a vehicle. At the front side of the vehicle, a bumper cover C covering the bumper reinforcement is provided (see FIG. 5A). The lower surface of the bumper cover C is higher than the upper end of a stopper ST. In addition, at the front of the vehicle, a current plate B extending downward from the lower surface of the bumper cover C is provided. The lower end of the current plate B is lower than the upper end of the stopper ST. In other words, the distance h from the road surface to the lower end of the current plate B is smaller than the distance H from the road surface to the upper end of the stopper ST. In addition, the current plate B is positioned behind the front end F of the vehicle. Note that, at the rear side of this vehicle, the bumper cover C is provided but the current plate B is not provided (see FIGS. 7A-7B).

Figure 1:
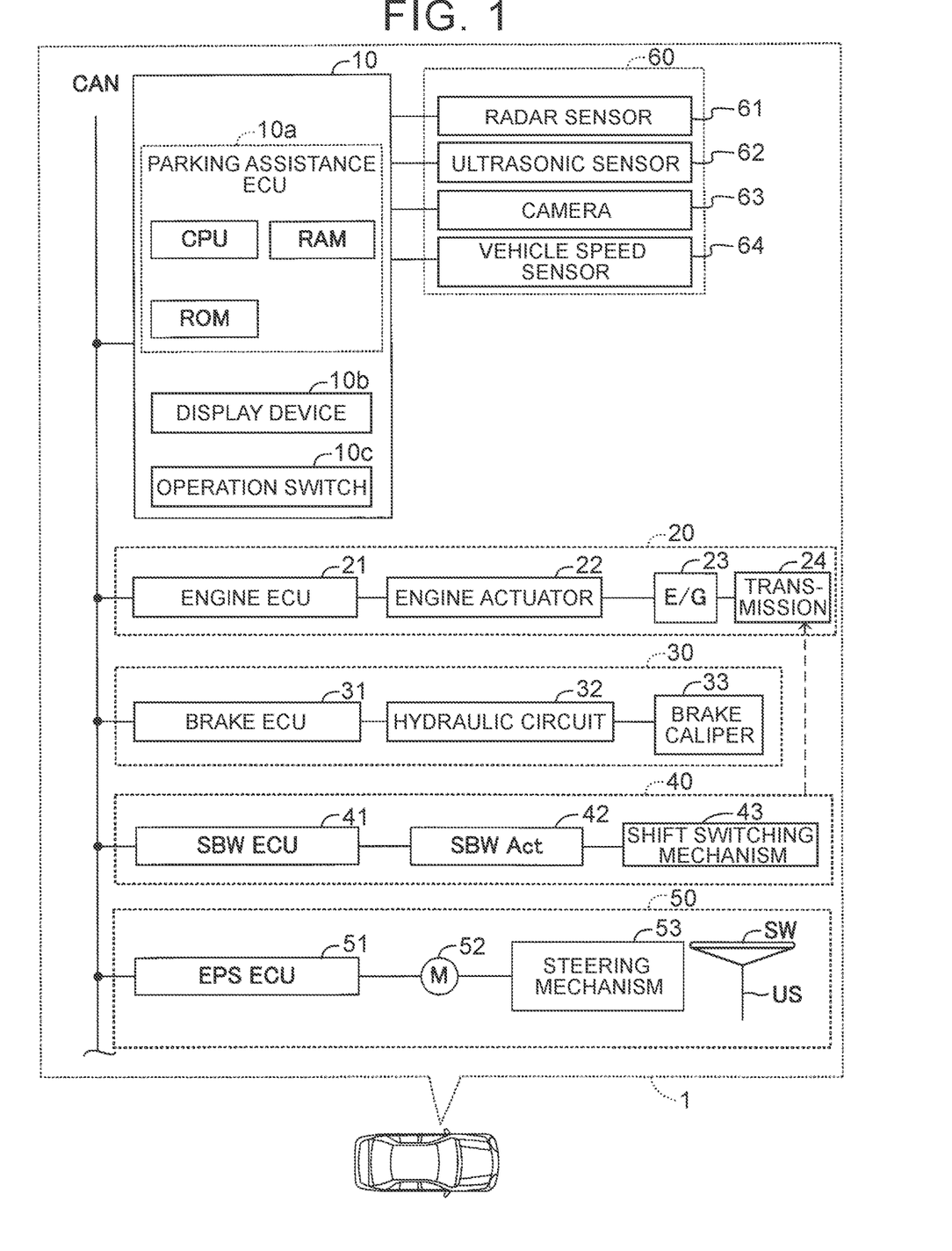
FIG. 1 is a block diagram of a parking assistance device according to one embodiment of the present disclosure.

The parking assistance device 1 performs parking assistance control for parking a vehicle in a parking area, designated (selected) by the driver, by causing the vehicle to travel autonomously to the parking area. A vehicle on which the parking assistance device 1 is mounted is sometimes referred to as "host vehicle" to distinguish the vehicle from other vehicles. As shown in FIG. 1, the parking assistance device 1 includes a control unit 10, a driving device 20, a braking device 30, a shift switching device 40, a steering device 50, and a surroundings sensor 60.

The control unit 10 includes a microcomputer (hereinafter, referred to as "parking assistance ECU 10a") that includes a CPU, RAM, and ROM. In this specification, "ECU", which means an electronic control unit, includes a microcomputer that includes a CPU, RAM, and ROM. The CPU implements various functions by executing instructions stored in the ROM.

The parking assistance ECU 10a is connected to other ECUs (engine ECU 21, brake ECU 31, SBW ECU 41, and EPS ECU 51 which will be described later) via Control Area Network (CAN) so that information can be sent and received to and from these ECUs.

In addition, the control unit 10 includes a display device 10b and an operation switch 10c. Examples of the display device 10b include a liquid crystal display device (LCD) and a display controller. The display device 10b displays an image (characters, figures, etc.) according to image data supplied from the parking assistance ECU 10a. Examples of the operation switch 10c include a pushbutton switch, a rotary encoder, and a touch panel. The operation switch 10c, when operated by the driver, sends a signal, which corresponds to the operation mode, to the parking assistance ECU 10a. When a predetermined condition is satisfied, the parking assistance ECU 10a causes the display device 10b to display one or more icons (options). The driver can operate the operation switch 10c to select (click or tap) one icon. The parking assistance ECU 10a performs processing (control) corresponding to the selected icon.

The driving device 20 generates driving force and applies the generated driving force to the driving wheels of the wheels (left front wheel, right front wheel, left rear wheel, and right rear wheel). The driving device 20 includes the engine ECU 21, an engine actuator 22, an internal combustion engine 23, a transmission 24, and a driving force transmission mechanism (not shown) that transmits driving force to the wheels. The engine ECU 21 is connected to the engine actuator 22. The engine actuator 22 includes a throttle valve actuator that changes the throttle valve opening degree of the internal combustion engine 23. The engine ECU 21 can change the torque, generated by the internal combustion engine 23, by driving the engine actuator 22. The torque generated by the internal combustion engine 23 is transmitted to the driving wheels via the transmission 24 and the driving force transmission mechanism (for example, the drive shaft). As described above, the engine ECU 21 controls the driving force of the vehicle by controlling the engine actuator 22.

When the vehicle to which the parking assistance device 1 is applied is a hybrid electric vehicle (HEV), a plug-in hybrid electric vehicle (PEHV), or a battery electric vehicle (BEV), the engine ECU 21 can control the driving force of the vehicle generated by one or both of the "internal engine and the electric vehicle" that is the vehicle driving source.

The braking device 30 applies braking force to the wheels. The braking device 30 includes the brake ECU 31, a hydraulic circuit 32, and a brake caliper 33. The hydraulic circuit 32 includes components such as a reservoir, an oil pump, various valve devices, and a hydraulic sensor (none shown in the figure). The brake caliper 33 is a hydraulic actuator including a cylinder and a piston. When oil is supplied to the cylinder, the piston is pushed out of the cylinder. The piston has, at its tip, a brake pad that is pressed against the brake disc to apply braking force to the wheel. The hydraulic circuit 32 adjusts the hydraulic pressure in the cylinder of the brake caliper 33 in response to a command from the brake ECU 31. This causes the brake caliper 33 to control the braking force of the wheels (brake discs).

The shift switching device 40 switches the shift position of the transmission 24. The shift switching device 40 includes a shift-by-wire (SBW) ECU 41, an SBW actuator 42, a shift switching mechanism 43, etc. The SBW ECU 41 is connected to the SBW actuator 42. The SBW actuator 42 controls the shift switching mechanism 43 in response to a shift switching command from the SBW ECU 41 to switch the shift position of the transmission 24. For example, the SBW actuator 42 switches the shift position of the transmission 24 from one of the positions of the parking position SP, forward position SD, and reverse position SR to any one of the other positions.

The steering device 50 controls the steering angles of the steered wheels (left front wheel and right front wheel). The steering device 50 includes an electric power steering ECU (hereinafter referred to as "EPS ECU") 51, an assist motor (M) 52, and a steering mechanism 53. The EPS ECU 51 is connected to the assist motor 52 (drive circuit of the assist motor 52). The assist motor 52 is incorporated in the steering mechanism 53. The steering mechanism 53 is a mechanism for steering the steered wheels in response to the rotation operation of the steering wheel SW. The steering mechanism 53 includes components such as the steering wheel SW, a steering shaft US connected to the steering wheel SW, and a steering gear mechanism (not shown). The EPS ECU 51 detects, via a steering torque sensor (not shown) provided on the steering shaft US, a steering torque that is input by the driver to the steering wheel SW and, based on the detected steering torque, drives the assist motor 52. When the assist motor 52 is driven, the EPS ECU 51 applies steering torque (steering assist torque) to the steering mechanism 53 for assisting the driver in the steering operation.

In addition, when a steering command is received from the parking assistance ECU 10a via CAN during execution of the parking assist control that will be described later, the EPS ECU 51 drives the assist motor 52 based on the steering torque specified by the steering command. Unlike the above-described steering assist torque given to assist the driver in the steering operation, this steering torque does not require the driver's steering operation and represents a torque applied to the steering mechanism 53 by a steering command received from the parking assistance ECU 10a. This torque changes the rudder angle of the steered wheels (that is, steering angle) of the vehicle.

The surroundings sensor 60 is configured to acquire vehicle surroundings information including the information about three-dimensional objects around the vehicle and the information about the lane markings on the road surface around the vehicle. The three-dimensional objects are, for example, moving objects, such as a car, a pedestrian, and a bicycle, and fixed objects such as a guardrail and a fence.

The surroundings sensor 60 includes a radar sensor 61, an ultrasonic sensor 62, and a camera 63. A vehicle does not need to include all of the radar sensor 61, ultrasonic sensor 62, and camera 63 as the devices for acquiring the vehicle surroundings information; instead, the vehicle is only required to include at least one of the radar sensor 61, ultrasonic sensor 62, and camera 63.

The radar sensor 61 includes a radar sending/receiving unit and a signal processing unit (not shown). The radar sending/receiving unit radiates radio waves in the millimeter wave band (hereinafter referred to as "millimeter wave") to the surrounding area of the vehicle and receives the millimeter wave (that is, reflected wave) reflected by a three-dimensional object that is present within the radiation range. The signal processing unit acquires the data representing the distance between the vehicle and a three-dimensional object, the relative speed between the vehicle and the three-dimensional object, and the relative position (direction) of the three-dimensional object with respect to the vehicle, based on the phase difference between the sent millimeter wave and the received reflected wave, the attenuation level of the reflected wave, and the time from the sending of the millimeter wave to the reception of the reflected wave. Then signal processing unit outputs the acquired data to the parking assistance ECU 10a.

The ultrasonic sensor 62 sends ultrasonic wave pulses to a predetermined range around the vehicle and receives reflected waves reflected by a three-dimensional object. The ultrasonic sensor 62 can detect the "reflection point that is a point on a three-dimensional object at which the sent ultrasonic wave is reflected" and the "distance between the ultrasonic sensor and the three-dimensional object" based on the time from the sending of the ultrasonic wave to the reception of the reflected wave. Then, the ultrasonic sensor 62 outputs the data representing the detected reflection point and distance to the parking assistance ECU 10a.

The camera 63 is, for example, a digital camera having a built-in charge coupled device (CCD) or CMOS image sensor (CIS) as the image sensor. The camera 63 outputs image data obtained by photographing the surrounding area of the vehicle at a determined frame rate. For example, the camera 63 photographs the vehicle surrounding area to be checked when parking the vehicle in the target parking area and acquires the image data. Then, the camera 63 sends the acquired image data to the parking assistance ECU 10a.

In addition, the surroundings sensor 60 includes a vehicle speed sensor 64. The vehicle speed sensor 64 includes a wheel speed sensor that generates one pulse signal (wheel pulse signal) each time the wheels of the host vehicle rotate by a predetermined angle. The vehicle speed sensor 64 counts the number of pulses of the wheel pulse signal per unit time sent from the wheel speed sensor, calculates the rotation speed (wheel speed) of each wheel based on the counted number of pulses, and calculates the vehicle speed Vs (actual vehicle speed) of the host vehicle based on the wheel speed of each wheel. The vehicle speed sensor 64 sends data representing the vehicle speed Vs to the parking assistance ECU 10a.

The parking assistance ECU 10a receives data from each of the radar sensor 61 and the ultrasonic sensor 62 each time a predetermined time (also referred to as "first predetermined time" in the following description) elapses. Based on the received data (the position of the reflection point at which the millimeter wave is reflected and the position of the reflection point at which the ultrasonic wave is reflected), the parking assistance ECU 10a generates a two-dimensional map. This two-dimensional map is a plan view, in which the position of the vehicle is the origin, the X axis indicates the forward traveling direction of the vehicle, and the Y axis indicates the left direction of the vehicle. The "position of the vehicle" is the predetermined center position (for example, the center of gravity) in the plan view of the vehicle. The parking assistance ECU 10a detects a three-dimensional object around the vehicle based on the shape of a group of reflection points in the two-dimensional map and identifies the position (distance and orientation) of the three-dimensional object with respect to the vehicle and the shape of the three-dimensional object.

In addition, the parking assistance ECU 10a acquires image data from the camera 63 each time the first predetermined time elapses. The parking assistance ECU 10a detects a three-dimensional object around the vehicle by analyzing the image data, acquired from the camera 63, and identifies (detects) the position (distance and orientation) of the three-dimensional object with respect to the vehicle and the shape, of the three-dimensional object. Then, the parking assistance ECU 10a adds the data (image) representing the three-dimensional object to the two-dimensional map.

In addition, the parking assistance ECU 10a analyzes the acquired image data and recognizes the lane markings that delineate a parking area drawn on the road surface of the parking lot. Then, the parking assistance ECU 10a adds data (image) representing the lane markings to the two-dimensional map.

The parking assistance ECU 10a detects an area for parking the vehicle as follows based on the two-dimensional map. In the description below, the area occupied by the vehicle when the vehicle is parked is referred to as "parking area A1." The parking area A1 is an area that is the smallest rectangle including the vehicle in a plan view (see FIGS. 4A-4B).

Based on the two-dimensional map formed as described above, the parking assistance ECU 10a detects an area around the vehicle where there is no three-dimensional object. When the area where there is no three-dimensional object is an area having a size and a shape that allow the vehicle to park with sufficient space around it, the parking assistance ECU 10a determines that the area as a "parkable area A0." That is, the parking assistance ECU 10a determines, as the parkable area A0, an area having a margin (a space where there is no three-dimensional object) equal to or greater in width than a predetermined width (for example, "50 cm") around the parking area A1. The parkable area A0 is a rectangular area similar to the parking area A1, with its long side larger than the total length of the vehicle (length in the front-rear direction) and with its short side larger than the total width of the vehicle (length in the left-right direction). For example, when lane markings on the road surface of the parking lot are detected, a rectangular area that does not extend across the lane markings is determined as a parkable area. The parking assistance ECU 10a sets the parking area A1 in the determined parkable area A0. At this time, the parking area A1 is set in such a way that the long side of the parking area A1 and the long side of parkable area A0 are parallel to each other and that the short side of the parking area A1 and the short side of parkable area A0 are parallel to each other. After setting the parking area A1 in this way, the parking assistance ECU 10a adds data (image) representing the parkable area A0 and the parking area A1 to the two-dimensional map. In the following description, the distance between one short side of parkable area A0 and one short side (front side of the vehicle) of the parking area A1 is referred to as "front margin M1"; similarly, the distance between the other short side of parkable area A0 and the other short side (rear side of the vehicle) of the parking area A1 is referred to as "rear margin M2." In addition, the distance between one long side of parkable area A0 and one long side (left side of the vehicle) of the parking area A1 is referred to as "left margin M3"; similarly, the distance between the other long side of parkable area A0 and the other long side (right side of the vehicle) of the parking area A1 is referred to as "right margin M4."

Parking Assistance Control

Figure 2A:
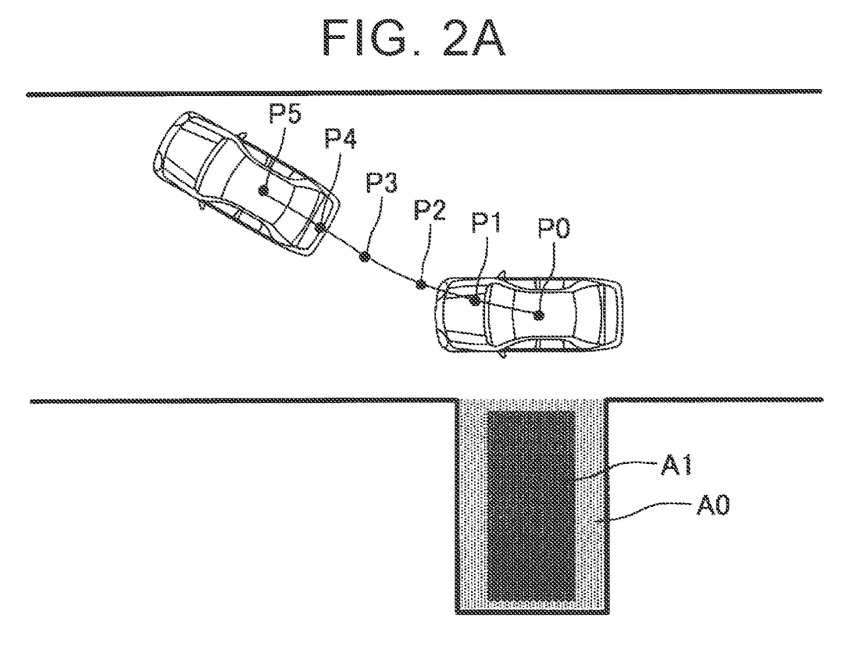
FIG. 2A is a plan view (two-dimensional map) showing a movement path (first path) at parking time.

The following describes how the parking assistance device 1 parks a vehicle in the parking area A1. The driver drives the vehicle toward the destination and temporarily stops the vehicle near the place where the vehicle is to be parked, as shown in FIG. 2A. In the description below, the position of the vehicle (the center position of the vehicle in a plan view) where the vehicle is temporarily stopped immediately before the parking assistance control is started is referred to as "initial position P0." Next, the driver operates the operation switch 10c to cause the parking assistance ECU 10a to start parking assistance control. Then, the parking assistance ECU 10a causes the display device 10b to display the two-dimensional map. When there is a plurality of parkable areas A0 (candidates), all parkable areas A0 are displayed.

When the driver operates the operation switch 10c to select one parkable area A0, the parking assistance ECU 10a sets the parking area A1 in the selected parkable area A0. At this point, the front margin M1 and the rear margin M2 have the same width, and the left side margin M3 and the right side margin M4 have the same width (see FIG. 4A). In addition, the parking assistance ECU 10a determines the position of the vehicle where the vehicle is to be parked in the parking area A1 (more specifically, the center position of the vehicle in the plan view) as the "parking position PP."

Next, the parking assistance ECU 10a causes the display device 10b to display an icon (mode selection icon) for selecting one of the parking modes, "forward parking mode" and "reverse parking mode." When the driver operates the operation switch 10c to select one parking mode, the parking assistance ECU 10a makes a traveling plan corresponding to the selected parking mode.

That is, the parking assistance ECU 10a makes a "traveling plan" that represents the traveling mode of the vehicle from initial position P0 to the parking position PP. The traveling plan includes a movement path, a shift pattern, a speed pattern, and a rudder angle pattern. When the reverse parking mode is selected, the parking assistance ECU 10a makes a traveling plan such as those shown in in FIGS. 2A-2B and FIG. 3.

The movement path is a path through which the vehicle can move from the initial position P0 to the parking position PP while keeping a predetermined interval between the vehicle body of the vehicle and three-dimensional objects (other vehicles, curbs, guardrails, etc.). For example, the parking assistance ECU 10a calculates a plurality of target positions P1, P2, . . . between the initial position P0 and the parking position PP (final target position). The parking assistance ECU 10a controls the other ECUs so that the center of the vehicle starts from the initial position P0, passes through the target positions P1, P2, . . . in this order, reaches the parking position PP, and stops with the entire vehicle in the parking area.

Figure 2B:
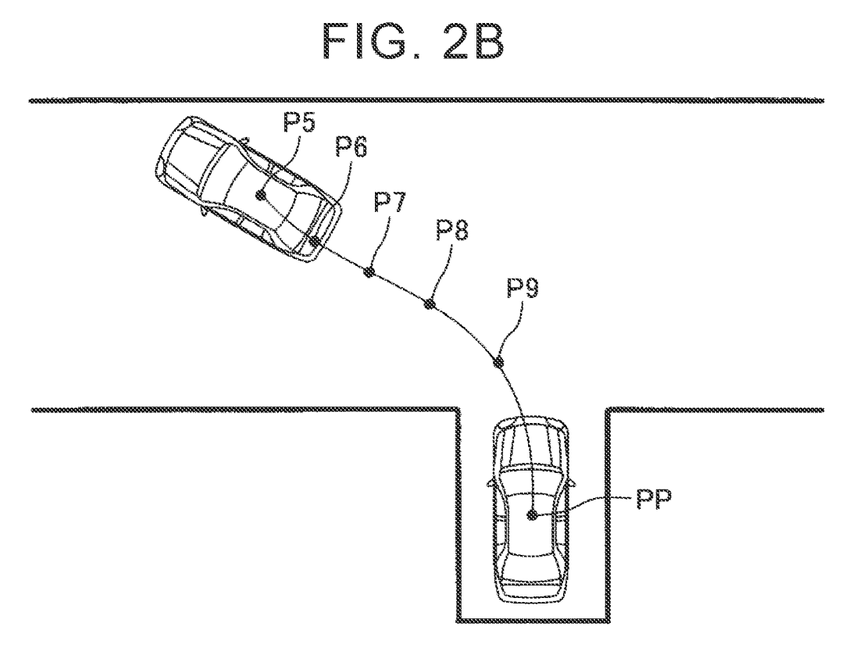
FIG. 2B is a plan view (two-dimensional map) showing a movement path (second path) at parking time.
Figure 3:
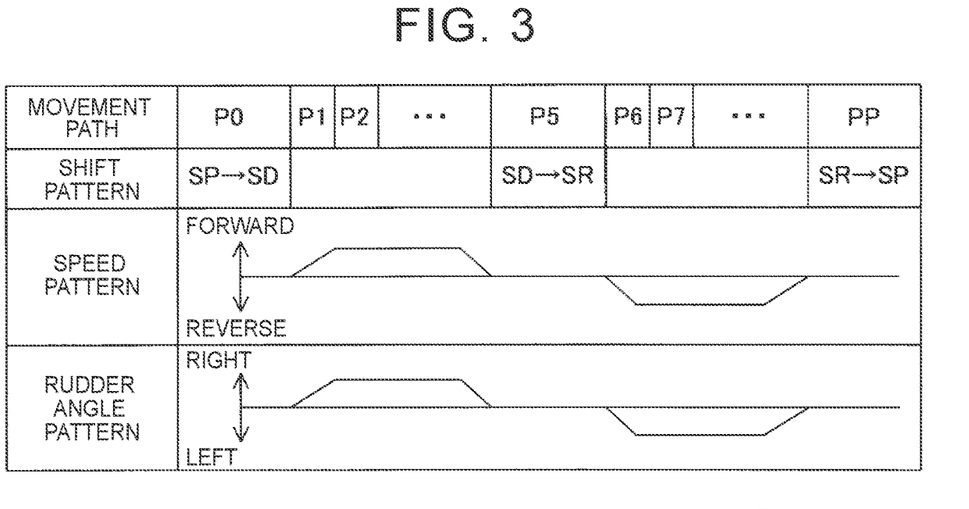
FIG. 3 is a table showing a traveling plan at parking time.

Note that, when the vehicle cannot be moved to the parking position PP by moving the vehicle forward or backward only once from the initial position P0, the parking assistance ECU 10a calculates the movement path as follows. For example, as shown in FIGS. 2A-2B and FIG. 3, the parking assistance ECU 10a calculates the target position Px (P5 in the example of the figure) at which the moving direction from the initial position P0 is switched. That is, in the example in the figures, the target position P5 is the position where the vehicle temporarily stops in order to switch the shift position of the transmission 24 from the forward position SD to the reverse position SR. Then, the parking assistance ECU 10a calculates a first movement path (P0 to P5 (FIG. 2A)) for moving the vehicle forward to the target position P5 and a second movement path (P5 to PP (FIG. 2B)) for moving the vehicle backward from the target position P5 to the parking position PP. Note that the figure shows an example in which the moving direction needs to be switched only once. When it is necessary to switch the moving direction two or more times, the parking assistance ECU 10a calculates a plurality of target positions for switching the moving direction.

The shift pattern, which is data indicating an association between target positions and shift positions, represents a change in the shift position when the vehicle travels on the movement path. The parking assistance ECU 10a sends a shift control command to the SBW ECU 41 via CAN according to the determined shift pattern. When the shift control command is received from the parking assistance ECU 10a, the SBW ECU 41 drives the SBW actuator 42 to change the shift position of the transmission 24 to the position specified by the shift control command.

The rudder angle pattern, which is data indicating an association between target positions and steering angles, represents a change in the steering angle when the vehicle travels on the movement path. The parking assistance ECU 10a sends a steering command (including a target steering angle) to the EPS ECU 51 via CAN according to the determined rudder angle pattern. When the steering command is received from the parking assistance ECU 10a, the EPS ECU 51 drives the assist motor 52 based on the steering torque, specified by the steering command, to match the actual steering angle with the target steering angle.

The speed pattern, which is data indicating an association between target positions and traveling speeds, represents a change in the traveling speed when the vehicle travels on the movement path. The parking assistance ECU 10a sends a driving force control command to the engine ECU 21 via CAN according to the determined speed pattern. When the driving force control command is received from the parking assistance ECU 10a, the engine ECU 21 controls the engine actuator 22 according to the driving force control command (that is, performs driving force control). In addition, the parking assistance ECU 10a sends a braking force control command to the brake ECU 31 according to the determined speed pattern. When the braking force control command is received from the parking assistance ECU 10a, the brake ECU 31 controls the hydraulic circuit 321 according to the braking force control command.

When the traveling plan is determined, the parking assistance ECU 10a causes the display device 10b to display the movement path (initial position P0 (current position), target positions P1, P2, . . . , and parking position PP) and to display an image (parking start icon) for starting parking (autonomous traveling). When the driver operates the operation switch 10c and selects the parking start icon, the parking assistance ECU 10a starts causing the vehicle to travel according to the traveling plan. When the driver depresses the brake pedal before the vehicle reaches the parking position PP, the parking assistance ECU 10a temporarily stops the progress of the traveling plan and causes the hydraulic circuit 32 and the brake caliper 33 to operate via the brake ECU 31 according to the operation mode of the brake pedal. After that, the parking assistance ECU 10a causes the display device 10b to display a resume icon for resuming the progress of the traveling plan and to display a suspend icon for suspending the parking assistance control. When the driver operates the operation switch 10c and selects the resume icon, the parking assistance ECU 10a resumes the progress of the traveling plan. That is, the parking assistance ECU 10a releases the braking of the vehicle and causes the vehicle to travel autonomously. On the other hand, when the driver selects the suspend icon, the parking assistance ECU 10a suspends the parking assistance control.

Incidentally, the stopper ST is installed in parkable area A0 in some cases. In that case, at the time when the vehicle temporarily stops at the initial position P0, the stopper ST may be outside the detection area of the surroundings sensor 60 and, therefore, the parking assistance ECU 10a may not be able to detect (recognize) the stopper ST. In this case, after the vehicle starts traveling autonomously from the initial position P0 toward the parking position PP, the parking assistance ECU 10a eventually becomes able to detect (recognize) the stopper ST at the time when the stopper ST enters the detection area of the surroundings sensor 60. Therefore, while the traveling plan is in progress, the parking assistance ECU 10a determines, at predetermined time intervals, whether the stopper ST is installed in the parkable area A0 based on the data acquired from the surroundings sensor 60 (for example, the ultrasonic sensor 62).

When it is detected that the stopper ST is installed in the parkable area A0, the parking assistance ECU 10a corrects the position and the direction of the parking area A1 with respect to the stopper ST according to the selected parking mode as described below and, at the same time, corrects the traveling plan.

Forward Parking Mode

Figure 4A:
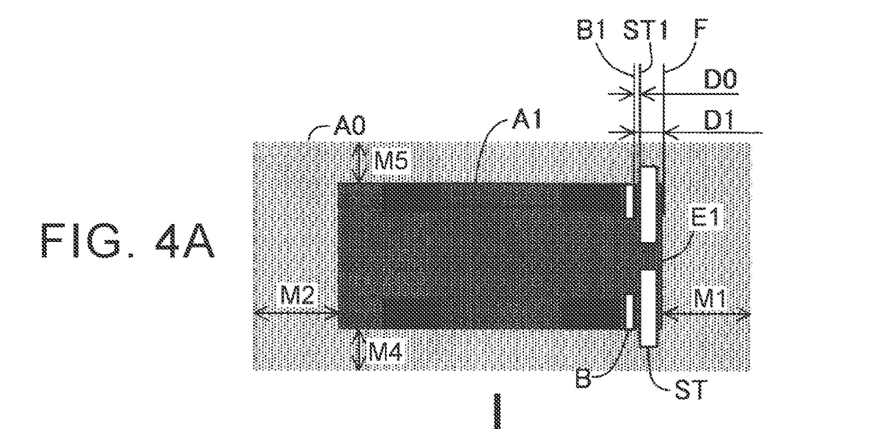
FIG. 4A is a plan view (two-dimensional map) showing a process of correcting a parking area in a forward parking mode.
Figure 4B:
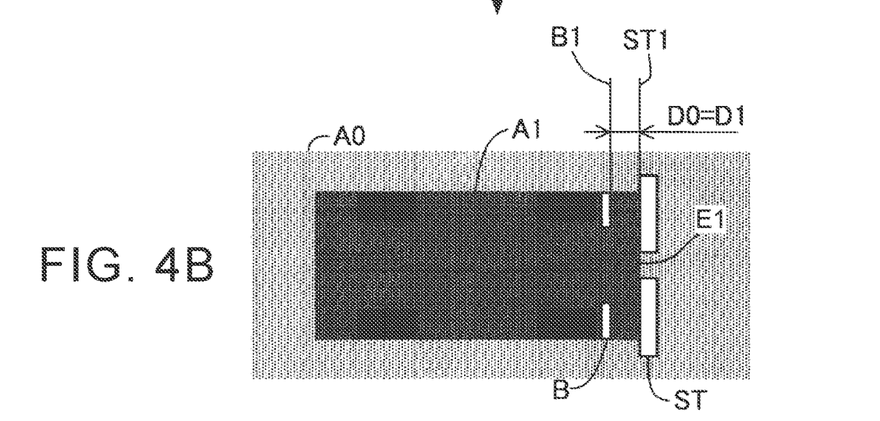
FIG. 4B is a plan view (two-dimensional map) showing a process of correcting a parking area in a forward parking mode.

When the forward parking mode is selected, the parking assistance ECU 10a corrects, on the two-dimensional map, the position and the direction of the parking area A1 from those in FIG. 4A to those in FIG. 4B so that the following conditions are satisfied.

(Condition 1a) The distance between the short side E1 of the parking area A1 (that is, the front end F of the vehicle (first reference point)) and the end ST1 of the stopper ST is equal to the first predetermined value of "0."

(Condition 1b) The short side E1 and the end ST1 are parallel to each other.

Figure 5A:
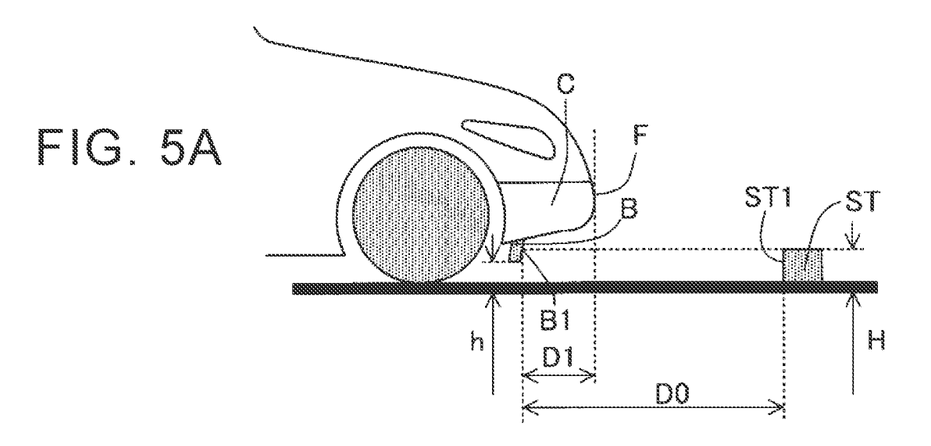
FIG. 5A is a side view showing a positional relationship between a vehicle parked in the forward parking mode and a stopper.

Note that (Condition 1a) can be paraphrased as "the distance D0 between the front end B1 of the current plate B and the end ST1 of the stopper ST (the surface facing the vehicle) is equal to the distance D1 between the front end B1 of the current plate B and the front end F of the vehicle."

Next, the parking assistance ECU 10a corrects the parking position PP based on the corrected the parking area A1.

The parking assistance ECU 10a corrects (remakes) the traveling plan based on the corrected parking area A1 and parking position PP. That is, the parking assistance ECU 10a calculates a movement path, a shift pattern, a speed pattern, and a rudder angle pattern so that, while keeping a predetermined interval between the vehicle body of the vehicle and three-dimensional objects (other vehicles, curbs, guard-rails, etc.), the vehicle can move from the current position (the position where the stopper ST is detected) to the corrected parking position PP and can stop with the entire vehicle in the parking area A1. Then, the parking assistance ECU 10a causes the vehicle to travel autonomously according to the corrected traveling plan for stopping (parking) the vehicle in the parking area A1.

Figure 5B:
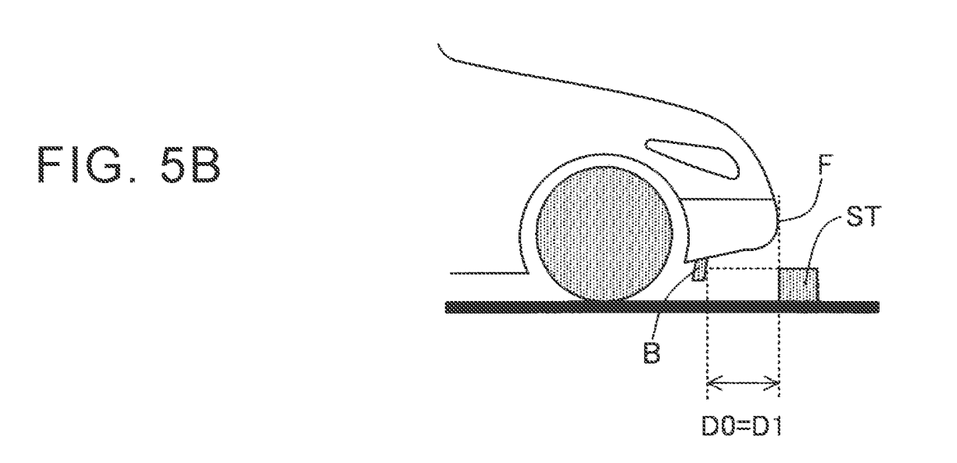
FIG. 5B is a side view showing a positional relationship between a vehicle parked in the forward parking mode and a stopper.

When the forward parking mode is selected as the parking mode and the stopper ST is installed in the parkable area as described above, the parking assistance ECU 10a causes the vehicle to stop (park) with the distance between the front end F of the vehicle and the end ST1 of the stopper ST (distance in the front-rear direction of the vehicle) being "0" as shown in FIG. 5B.

Reverse Parking Mode

Figure 6A:
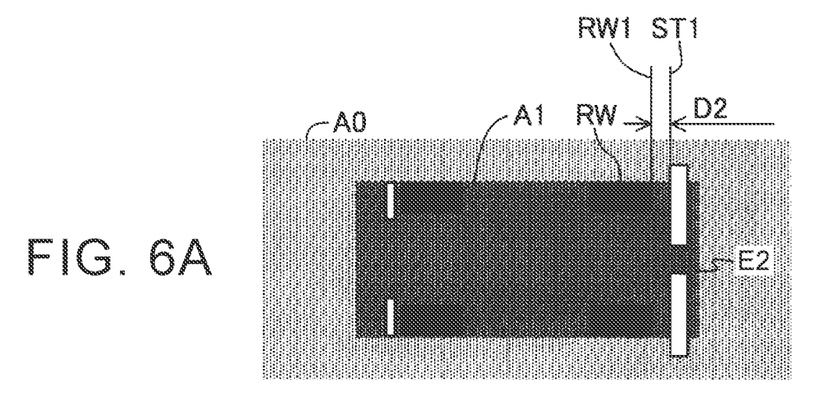
FIG. 6A is a plan view (two-dimensional map) showing a process of correcting a parking area in a reverse parking mode.
Figure 6B:
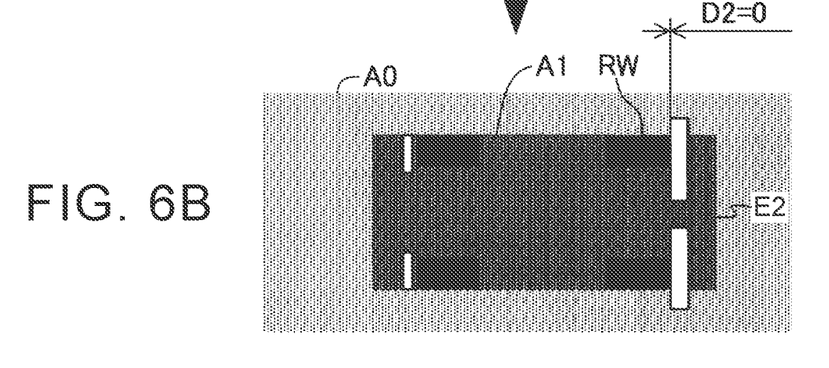
FIG. 6B is a plan view (two-dimensional map) showing a process of correcting a parking area in a reverse parking mode.

On the other hand, when the reverse parking mode is selected and the stopper ST is installed in the parkable area, the parking assistance ECU 10a corrects, on the two-dimensional map, the position and the direction of the parking area A1 from those in FIG. 6A to those in FIG. 6B so that the following conditions are satisfied.

(Condition 2a) The end ST1 of the stopper ST is positioned in the parking area A1.

(Condition 2b) The end ST1 of the stopper ST (end on the vehicle side) and the short side E2 of the parking area A1 are parallel to each other.

(Condition 2c) The distance D2 between the end ST1 and the end RW1 of the rear side of the rear wheels RW (second reference point) of the vehicle is equal to the second predetermined value of "0."

Note that the position of the end RW1 in the parking area A1 is calculated in advance based on the specifications of the vehicle and stored in the ROM of the parking assistance ECU 10a.

Then, as in the case when the forward parking mode is selected, the parking assistance ECU 10a corrects (remakes) the traveling plan and causes the vehicle to travel autonomously according to the corrected traveling plan for stopping (parking) the vehicle in the parking area A1.

Figure 7B:
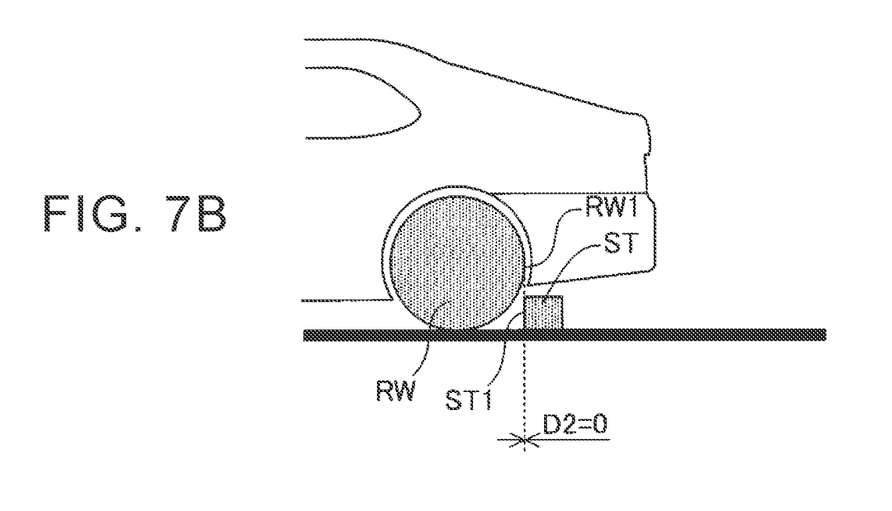
FIG. 7B is a side view showing a positional relationship between a vehicle parked in the reverse parking mode and a stopper.

When the reverse parking mode is selected as the parking mode and the stopper ST is installed in the parkable area as described above, the parking assistance ECU 10a causes the vehicle to stop (park) with the distance between the rear end of the rear wheels (second reference point) and the stopper ST (distance in the front-rear direction of the vehicle) being approximately "0" as shown in FIG. 7B (that is, with the rear wheels slightly separated from the stopper ST).

In some cases, a part of the corrected parking area A1 may lie outside of the parkable area A0, or any one of the front margin M1, rear margin M2, left margin M3, and right margin M4 may be smaller than the predetermined value. In such a case, the parking assistance ECU 10a notifies the driver that the parking assistance control (autonomous traveling) cannot be continued and then interrupts the parking assistance control.

In addition, in both forward parking and reverse parking, the parking assistance ECU 10a may not be able to remake the traveling plan of a travel from the position where the stopper ST is detected to the corrected parking position PP. For example, when the extending direction of the stopper is significantly inclined toward the extending direction of the short side of the parkable area, it is sometimes impossible to provide a path along which the vehicle will move while keeping a predetermined interval between the vehicle body of the vehicle and a three-dimensional object around the vehicle. In this case, the parking assistance ECU 10a notifies the driver that the parking assistance control (autonomous traveling) cannot be continued and then interrupts the parking assistance control.

Figure 8:
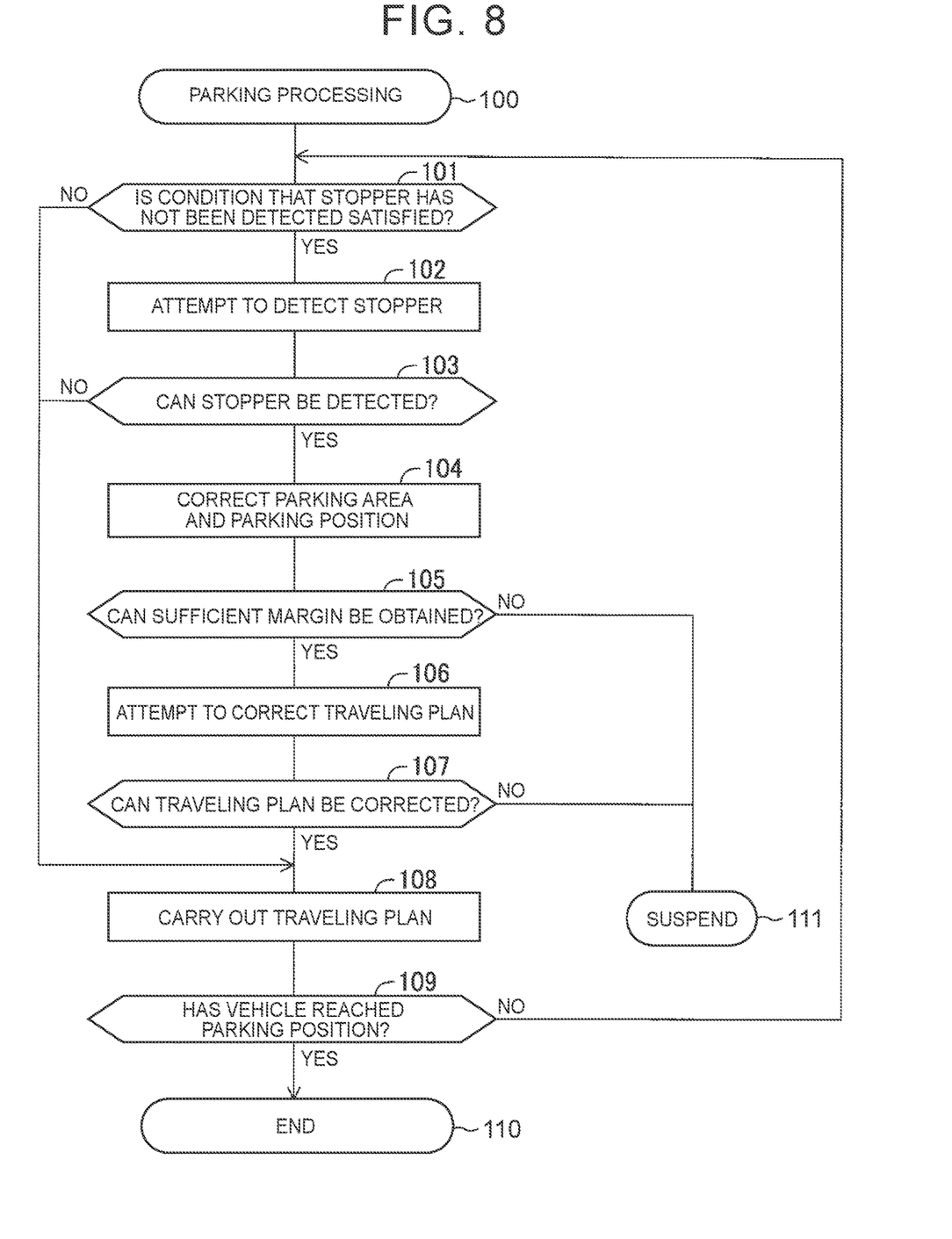
FIG. 8 is a flowchart of a parking program.

Next, with reference to FIG. 8, the operation (the parking program that implements the control for causing a vehicle to travel autonomously to the parking area A1 for parking there) of the CPU of the parking assistance ECU (hereinafter, simply referred to as "CPU") 10a will be described more in detail.

When the driver operates the operation switch 10c to select the parking start icon, the CPU starts executing the parking program shown in the figure. The CPU starts parking processing from step 100.

Next, in step 101, the CPU determines whether the condition that the stopper ST has not been detected is satisfied. When the condition that the stopper ST has not been detected is satisfied (step 101: Yes), the processing of the CPU proceeds to step 102.

Next, in step 102, the CPU attempts to detect the stopper ST based on the information acquired from the surroundings sensor 60. Next, in step 103, the CPU determines whether the stopper ST can be detected. When the stopper ST can be detected (step 103: Yes), the processing of the CPU proceeds to step 104. On the other hand, when the stopper ST cannot be detected, the processing of the CPU proceeds to step 108 that will be described later.

When the processing proceeds to step 104, the CPU corrects the parking area A1 and the parking position PP based on the selected parking mode and on the position and direction of the stopper ST. That is, when forward parking is selected, the CPU corrects the parking area A1 so that the conditions described above, (condition 1a and condition 1b), are satisfied and corrects the parking position PP based on the corrected parking area A1. On the other hand, when reverse parking is selected, the CPU corrects the parking area A1 so that the conditions described above, (condition 2a) to (condition 2c), are satisfied and corrects the parking position PP based on the corrected parking area A1. Then, the processing of the CPU proceeds to step 105.

When the processing proceeds to step 105, the CPU determines whether a sufficient margin can be obtained around the corrected parking area A1 based on the positional relationship between the parkable area A0 and the corrected parking area A1. Next, when a sufficient margin can be obtained around the parking area A1 (step 105: Yes), the processing of the CPU proceeds to step 106.

When the processing proceeds to step 106, the CPU attempts to correct the traveling plan based on the corrected parking area A1 and the corrected parking position PP. That is, the CPU attempts to make a traveling plan for moving the vehicle to the corrected parking area A1 while keeping a predetermined interval between the vehicle body and a three-dimensional object around the vehicle.

Next, in step 107, the CPU determines whether the traveling plan can be corrected. When the traveling plan can be corrected (step 107: Yes), the processing of the CPU proceeds to step 108.

When the processing proceeds to step 108, the CPU carries out the traveling plan. That is, the CPU, for example, controls components such as other ECUs to move the vehicle to the next target position. Furthermore, the CPU, for example, causes the shift switching device 40 to switch the shift position. When a predetermined time has elapsed from the start of step 108, the processing of the CPU proceeds to step 109.

Next, in step 109, the CPU determines whether the vehicle has reached the parking position PP. When the vehicle has reached the parking position PP (step 109: Yes), the CPU ends the parking processing in step 110. On the other hand, when the CPU determines in step 109 that the vehicle has not yet reached the parking position PP (step 109: No), the processing of the CPU returns to step 101.

When the stopper ST has been detected in step 101, that is, when the condition is not satisfied in step 101 (step 101: No), the processing of the CPU proceeds to step 108. That is, in this case, since the parking area A1 has already been corrected based on the parking mode and stopper ST (that has been detected), the processing proceeds from step 101 to step 108 directly without executing steps 102 to 107. Then, the CPU causes the vehicle to travel autonomously according to the corrected traveling plan.

When the CPU determines in step 103 that "the stopper ST cannot be detected" (step 103: No), the processing proceeds to step 108 to cause the vehicle to travel autonomously according to the initial traveling plan.

When the CPU determines in step 105 that "a sufficient margin cannot be obtained around the corrected parking area A1" (step 105: No), the processing proceeds to step 111 to stop the vehicle and, at the same time, notifies the driver that it is impossible to continue the parking assistance control and, then, suspends the parking processing.

When the CPU determines in step 107 that "the traveling plan cannot be corrected" (step 107: No), the processing of the CPU proceeds to step 111 to stop the vehicle and, at the same time, notifies the driver that it is impossible to continue the parking assistance control and, then, suspends the parking processing.

Effects

As described above, the parking assistance ECU 10*a* of the parking assistance device 1 according to this embodiment causes the vehicle to be forward parked with the distance in the vehicle front-rear direction between the front end F of the vehicle and the stopper ST (end ST1) being "0." Therefore, the parking assistance ECU 10*a* can prevent the current plate B from hitting the stopper ST, thus preventing damage in that part. Note that, since the distance between the lower surface of the bumper cover C at the rear side of the vehicle and the road surface is relatively large, it is unlikely that the part will hit the stopper ST. Therefore, the parking assistance ECU 10*a* causes the vehicle to be reverse parked with the distance in the vehicle front-rear direction between the rear end RW1 of the rear wheels RW and the stopper ST (end ST1) being "0" (with the rear wheels RW slightly separated from the stopper ST).

The present disclosure is not limited to the above embodiment, and various modifications can be used within the scope of the present disclosure.

First Modification

In the embodiment described above, the distance (distance in the front-rear direction of the vehicle) between the front end F of the vehicle and the end ST1 of the stopper ST is "0" at the time when forward parking is completed. Instead of this, the parking area A1 may be set (corrected), for example, in such a way that the distance between the front end B1 of the current plate B and the end ST1 of the stopper ST is greater than "0" and that the front end F of the vehicle is positioned slightly in front of the end ST1 of the stopper ST. In addition, in the embodiment described above, the distance between the end RW1 of the rear wheels RW of the vehicle and the end ST1 of the stopper ST is "0" at the time when reverse parking is completed. Instead of this, the parking area A1 may be set (corrected), for example, in such a way that, for a vehicle model having a portion that is at the rear side of the vehicle and is lower than the stopper ST (for example, a part extending downward from the lower surface of the bumper cover C), the distance between the rear end of the vehicle (second reference point) and the end ST1 of the stopper ST matches a predetermined value equal to or greater than "0." In those cases, the recommended configuration is that the parking assistance ECU 10*a* detects the height H of the stopper ST and, depending on the detection result, sets the distance between the reference point and the stopper ST (end ST1) in such a way that the exterior parts at the front side, and at the rear side, of the vehicle do not hit the stopper ST.

Second Modification

The positional relationship between the end ST1 of the stopper ST and the vehicle at the time when parking is completed (that is, the distance between the reference point of the vehicle (for example, the front end or the rear end, or the front wheels or the rear wheels, of the vehicle) and the end ST1 of the stopper ST) may be changed (designated) by the driver. For example, the configuration may be such that the driver can designate the reference point of the vehicle using the operation switch 10*c* and, in addition, enter a numeric value as the target value of the distance between the reference point and the end ST1 of the stopper ST (that is, the first predetermined value or the second predetermined value) so that the first predetermined value or the second predetermined value can be changed. This configuration allows the driver to change the distance between the end ST1 of the stopper ST and the reference point at the time when parking is completed according to the driver's preference.

Third Modification

The parking assistance ECU 10*a* may be configured in such a way that, when it is detected that the stopper ST is installed in the parkable area A0, the parking assistance ECU 10*a* sequentially measures, from that point, the distance between the reference point of the vehicle and the stopper ST (end ST1) (performs sequential calculation based on the information acquired from the surroundings sensor 60) and, when the calculation result matches the predetermined value, causes the vehicle to stop.

What is claimed is:

1. A parking assistance device comprising:
    a driving device configured to apply driving force to driving wheels of wheels of a host vehicle;
    a braking device configured to apply braking force to the wheels;
    a steering device configured to control a steering angle of steered wheels of the wheels;
    a surroundings sensor configured to acquire target information, the target information being information about targets around the host vehicle; and
    a parking assistance control device mounted on the host vehicle and configured to perform parking assistance control, the parking assistance control being configured
    to detect a parkable area based on the target information, the parkable area being an area where the host vehicle is able to be parked,
    to cause the host vehicle to move from an initial position into the parkable area by controlling the driving device, the braking device, and the steering device, the initial position being a position of the host vehicle at a time when the parkable area is detected, and
    when the parking assistance control device detects, based on the target information, that a stopper is installed in the parkable area, to cause the host vehicle to stop with a position and direction of the host vehicle with respect to the stopper matching a predetermined position and direction,
    wherein the parking assistance control device is configured to cause the host vehicle to stop with a distance between a predetermined first reference point of the host vehicle and the stopper matching a first predetermined value so that the host vehicle is forward parked in a state in which a front end of a part that is on a front side of the host vehicle and is lower than the stopper is separated from the stopper.

2. The parking assistance device according to claim 1, wherein a driver is able to change the first predetermined value.

3. The parking assistance device according to claim 1, wherein the parking assistance control device is configured to cause the host vehicle to stop with a distance between a predetermined second reference point of the host vehicle and the stopper matching a second predetermined value so that the host vehicle is reverse parked in a state in which a rear end of a part that is on a rear side of the host vehicle and is lower than the stopper is separated from the stopper.

4. The parking assistance device according to claim 3, wherein a driver is able to change the second predetermined value.

\* \* \* \* \*